July 23, 1963 F. A. CARSTENS 3,098,620
METHOD AND APPARATUS FOR MANUFACTURING
OF HIGH STRENGTH CYLINDRICAL SHELLS
Filed July 25, 1960 4 Sheets-Sheet 1

INVENTOR.
Fred A. Carstens
BY
Andrus & Starke
Attorneys

July 23, 1963 F. A. CARSTENS 3,098,620
METHOD AND APPARATUS FOR MANUFACTURING
OF HIGH STRENGTH CYLINDRICAL SHELLS
Filed July 25, 1960 4 Sheets-Sheet 2

INVENTOR.
Fred A. Carstens
BY
Andrus & Starke
Attorneys

INVENTOR.
Fred A. Carstens
BY
Andrus & Starke
Attorneys

July 23, 1963

F. A. CARSTENS 3,098,620

METHOD AND APPARATUS FOR MANUFACTURING
OF HIGH STRENGTH CYLINDRICAL SHELLS

Filed July 25, 1960

INVENTOR.
Fred A. Carstens
BY
Andrus & Starke
Attorneys

3,098,620
METHOD AND APPARATUS FOR MANUFACTURING OF HIGH STRENGTH CYLINDRICAL SHELLS
Fred A. Carstens, Milwaukee, Wis., assignor, by mesne assignments, to Chicago Bridge & Iron Company, Oak Brook, Ill., a corporation of Illinois
Filed July 25, 1960, Ser. No. 45,099
6 Claims. (Cl. 242—75.2)

This invention relates to a method and apparatus for manufacture of high strength cylindrical shells, and particularly to the manufacture of such shells by what is known as coil wrapping.

In coil wrapping of cylindrical shells, as heretofore employed, considerable difficulty has been encountered in obtaining the desired uniform tightness of contact between successive layers of the structure and also in maintaining a reasonably straight wrap. This is particularly so where cylinders of substantial length are needed and the sheet has a slight crown provided by a tapering in thickness for a given width adjacent the side edges.

In Patents No. 2,268,961, No. 2,273,736, and No. 2,331,504 to Gwynne Raymond et al., it is proposed to coil wrap the cylindrical portion of pressure vessels and to control the tightness by means of a clamp on the ribbon or strip and which moves with the latter under the resistance of variable hydraulic pull means. Such a procedure requires that the ribbon or strip be welded frequently as it is applied to the cylinder so that the clamp may be released periodically for return to a new starting position where it again clamps the ribbon or strip.

Where it is desirable to avoid frequent welding of the layers as the coil is wrapped it is impractical to use the Raymond et al. method without losing some tightness of the layers.

Applicant has discovered that it is possible to utilize a continuous frictional brake type of resistance on the sheet being wrapped, and which will give accurate and positive control of the stressing of the sheet and tightness of wrap at all times, thereby making it unnecessary to weld the structure frequently during the coiling operation. For this purpose the present invention employs a hydraulic friction clamp on the sheet and extending transversely thereof just ahead of the position of wrap. The friction may be suitably varied from side to side of the sheet to control the straightness of wrap, and from time to time to control the tightness or the pre-stressing of the final structure.

Applicant has also discovered that by employing a predetermined heat softening of the sheet just ahead of the point of wrapping contact it is possible to obtain certain pre-stressing advantages from the subsequent shrinking of the metal after wrapping. And where there is undue tendency for the sheet to skew when wrapping it, it is possible to apply the heating to the shorter side and thereby return the sheet to alignment for wrapping.

The invention is illustrated in the accompanying drawings in which

Figure 1:
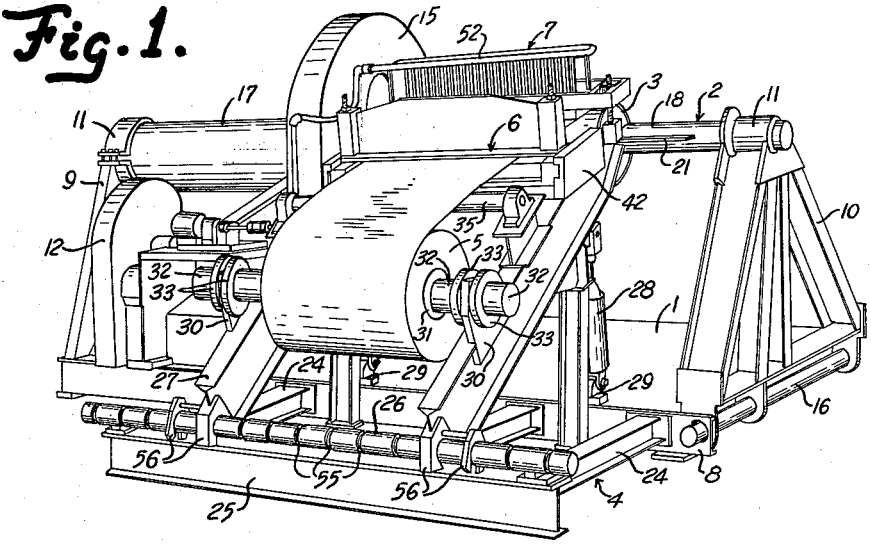
FIG. 1 is a perspective view of the machine looking toward the front and one end.
Figure 2:
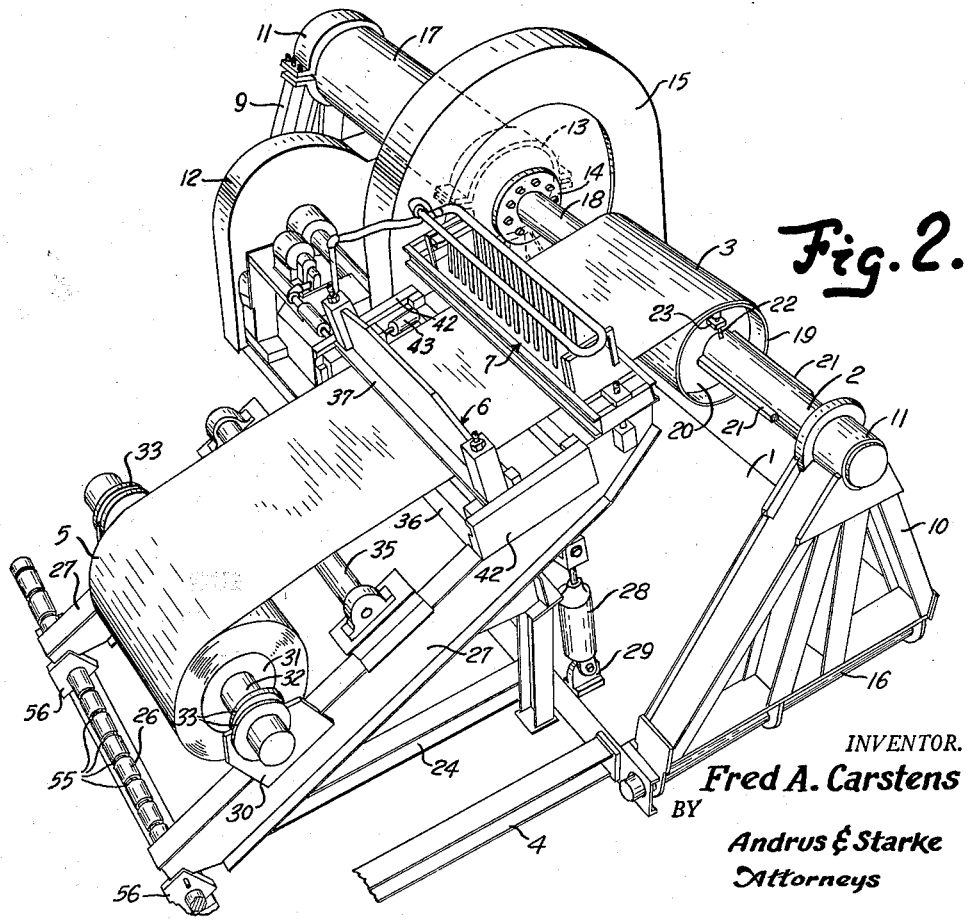
FIG. 2 is another perspective view taken from above the machine.
Figure 3:
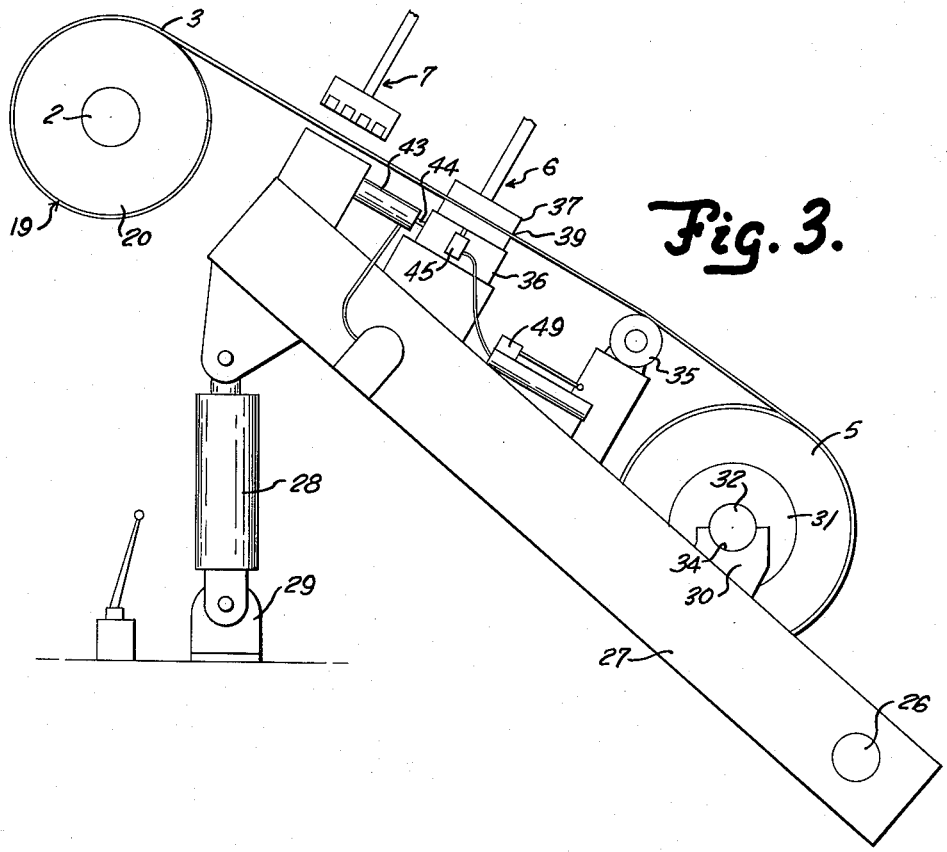
FIG. 3 is a partially schematic end view illustrating the operation of coil wrapping.

The apparatus of the invention comprises, in general, a main frame 1, a rotary spindle 2 carried by the frame and adapted to receive the end of the sheet 3 and coil the same into a cylinder, a side frame 4 supporting the supply coil 5 of sheet material, the friction brake means 6 and a heating means 7.

The main frame 1 comprises a rectangular base 8 of suitable I beam and channel construction with braced upstanding cradle ends 9 and 10 which have aligned bearings 11 at the top for rotatably supporting the spindle 2.

Figure 6:
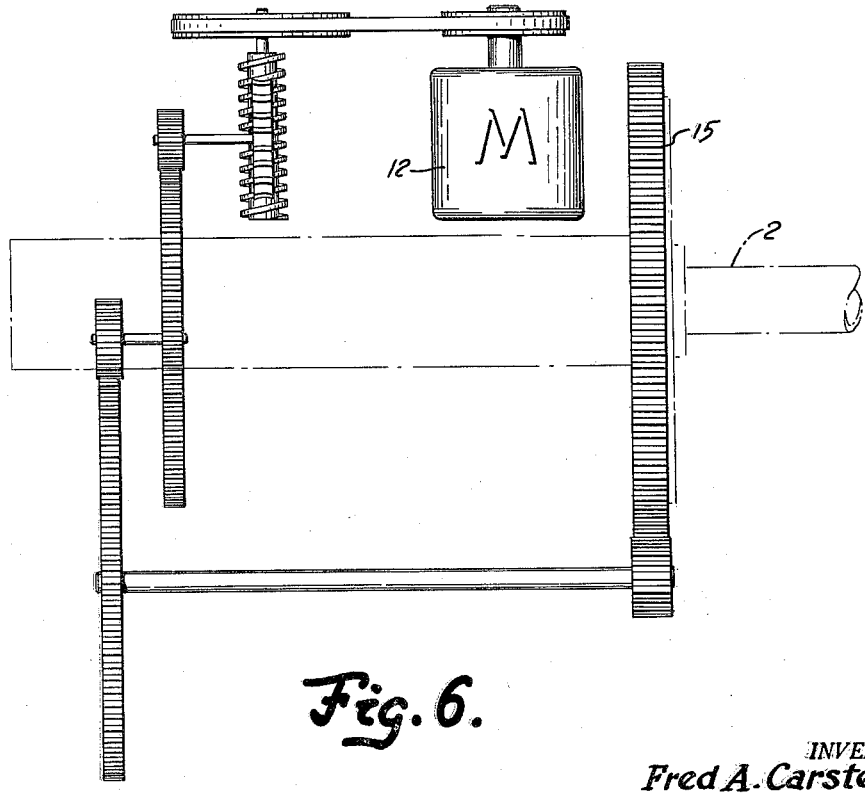
FIG. 6 is a schematic showing of the mechanical drive for the spindle.
Figure 7:
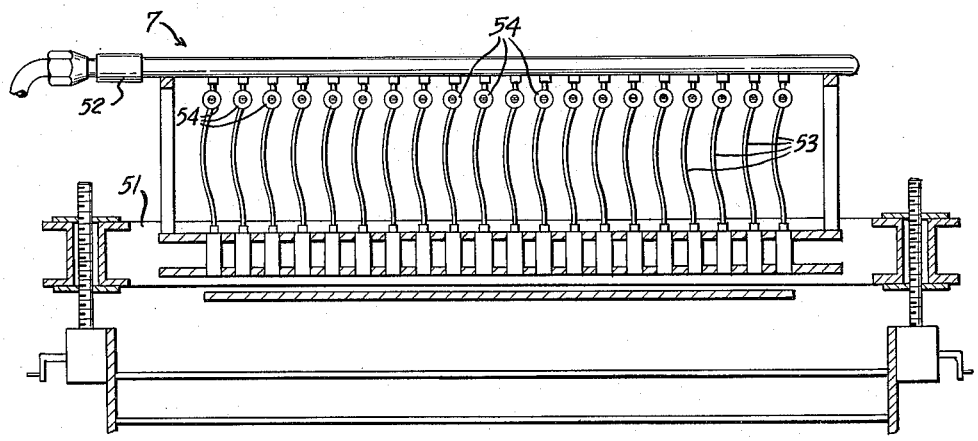
FIG. 7 is a longitudinal upright section of the heating apparatus.
Figure 8:
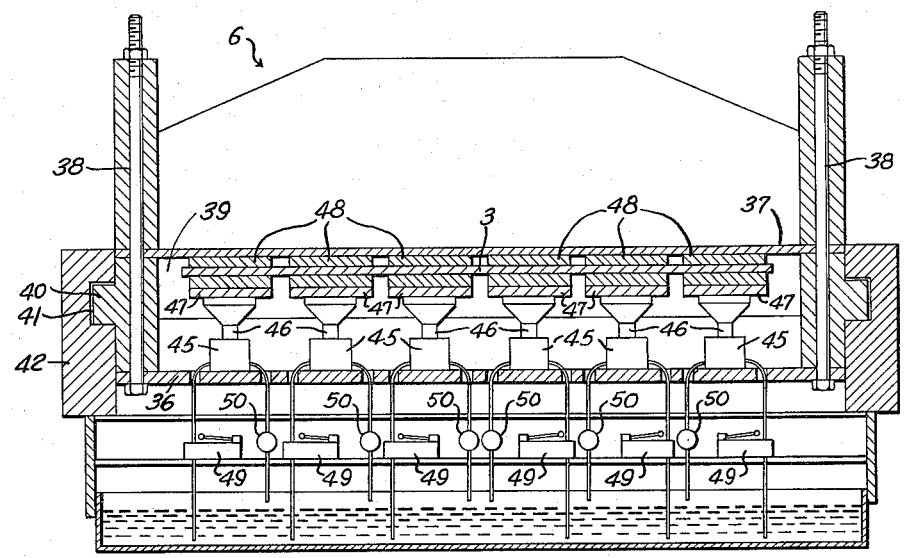
FIG. 8 is a longitudinal upright section of the brake mechanism.

The base 8 supports a variable speed power means 12 shown in FIG. 6 and which is suitably connected to spindle 2 by reduction gearing to drive the same with the necessary torque force to obtain the desired pre-stressed structure in the product, as explained hereinafter.

The base 8 also supports an upstanding cradle 13 intermediate the cradle ends 9 and 10 and having a bearing 14 aligned with bearings 11 to support the spindle 2 when cradle 10 is removed as described hereinafter for loading and unloading of the spindle. The drive connection 15 for power drive 12 to the spindle is adjacent to bearing 14.

The upstanding frame end 10 is mounted on a horizontal transverse pivot rod 16 across the end of the frame to permit the end 10 to be pivoted away from the machine and down to a horizontal position.

Figure 4:
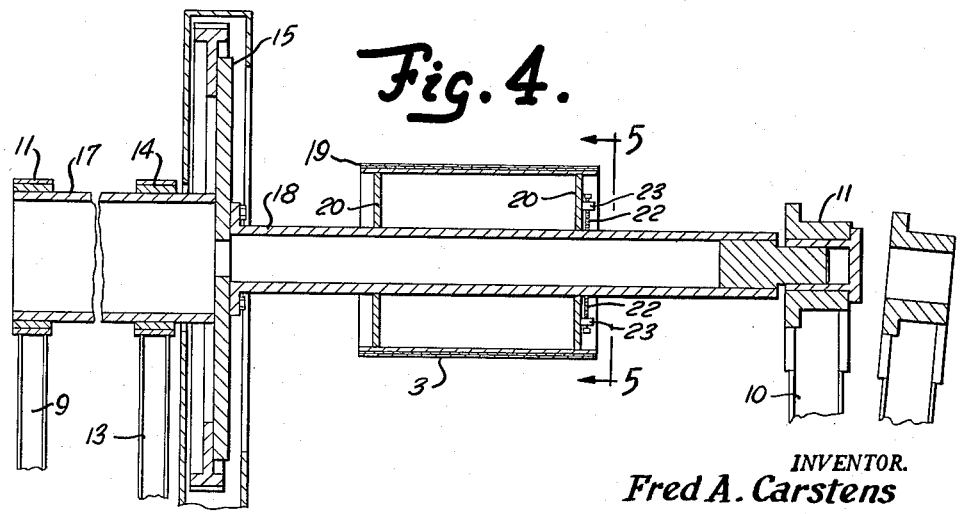
FIG. 4 is a longitudinal axial section of a portion of the spindle and its support showing the mounting of the cylindrical core thereon.
Figure 5:
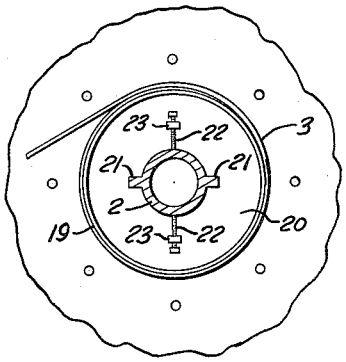
FIG. 5 is a transverse section taken on line 5—5 of FIG. 4 showing the mounting of the core.

The spindle 2 is made in two sections, the section 17 between frame end 9 and the central cradle 13 and extending through the bearings 11 of end 9 and bearing 14 of cradle 13 being of substantial diameter and strength, and the section 18 between bearing 14 and the bearing 11 in frame end 10 being of relatively small diameter to receive and accommodate cores of different diameters for wrapping cylinders. The journal bearing sleeve for bearing 11 in frame end 10 is removable to permit tilting of the frame end relative to the spindle as shown in FIG. 4.

Section 18 of spindle 2 is adapted to receive a core 19 which may constitute the inner layer of the final cylinder and upon which the sheet is wrapped in coil fashion to produce the cylinder. The core 19 is preferably substantially thicker than sheet 3 and is secured upon spindle section 18 by means of a supporting disc 20 at each end. Rotational interlock is providd between spindle section 18 and discs 20 as by longitudinal flanges or keys 21 on section 18 and which fit in corresponding slots in the discs. The core 19 is secured longitudinally by employing one or more set screws 22 threaded through corresponding brackets 23 on one of the discs 20 and into pressure contact with spindle section 18.

The side frame 4 comprises a pair of horizontal end beams 24 extending laterally from the front side beam of base 8, and a front cross beam 25 rigidly joining the outer ends of beams 24 parallel to the front of base 8. A pivot pin 26 on beam 25 pivotally carries two parallel floating side beams 27 inclined upwardly toward spindle section 18 and which are adjustably supported at their upper ends on hydraulic cylinders 28 and vertical posts 29 adjacent the front beam of base 8.

The side beams 27 have upstanding trunnion receiving brackets 30 thereon for supporting the supply coil 5. For this purpose the supply coil 5 is mounted on a mandrel 31 on a trunnion shaft 32 which has a pair of spaced flanges 33 near each end for receiving the corresponding brackets 30 therebetween. Each bracket 30 has a bearing recess 34 of U shape in its upper edge for receiving the shaft 32 and thereby supporting the supply coil 5 for free rotation parallel to spindle 2.

The sheet 3 from supply coil 5 is threaded over a cross roller 35 on floating beams 27, through the friction clamp or brake 6, beneath the heater 7 and over the core 19, and the advance edge of the sheet is then welded to the core 19.

The brake 6 comprises a rectangular frame made up of a lower transverse bar 36 and an upper transverse bar 37 secured together by suitable vertical bolts 38 at the correspoding ends and defining a transverse slit or throat 39 through which the sheet 3 moves.

The ends of brake 6, preferably of bar 36, have fixed keys 40 slidable in corresponding grooves 41 in end plates 42 rigidly carried by side beams 27 near the upper ends of the latter. The grooves 41 extend generally parallel to the course of movement of sheet 3 through throat 39 and movement of brake 6 in the direction of movement of sheet 3 is resisted by hydraulic cylinders 43 carried by plates 42 and having their piston rods 44 parallel to grooves 41 and secured to the lower bar 36. This construction provides a means for measuring and indicating the pull on sheet 3 effected by rotation of spindle 2 and the resistance of brake 6 at all times.

The lower bar 36 of brake 6 carries a series of generally vertically disposed hydraulic cylinders 45 having upwardly extending pistons 46 supporting individual friction elements 47 facing upwardly to engage sheet 3 and define the lower surface of throat 39.

The upper bar 37 of brake 6 carries a series of friction elements 48 facing downwardly to engage sheet 3 and define the upper surface of throat 39.

The sheet 3 is thus frictionally clamped between elements 47 and 48 under forces determined by the hydraulic pressure admitted to cylinders 45. The pull of sheet 3 effected by rotation of spindle 2 causes the sheet to slowly slip through throat 39 under the constant frictional resistance applied thereto by elements 47 and 48. This pull stresses the sheet to such an extent as to effect straightening of it prior to its wrapping upon spindle 2. In other words, the throat 39 functions as a sheet straightener in the operation of the apparatus.

The surface area of friction elements 47 and 48 should be substantial in order to apply the necessary friction to the sheet 3 without gouging the surface of the sheet and by hydraulic pressures in cylinders 45 of practical limits.

The pressures in cylinders 45 may be varied as the wrapping progresses to control the prestressing of the product wherein it is desirable to have a tension stress in the outer layers or portion of the wall and a compression stress in the core 19 and adjacent inner layers.

The pressures in the individual cylinders 45 may be kept the same, if desired, but by varying the pressure for individual cylinders differently it is possible to increase or decrease the friction on sheet 3 at either side independently of the other side, and thereby effect straightening of the coiling or wrapping of the sheet on core 19 should there be a tendency for the sheet to skew.

The hydraulic pressure for cylinders 45 may be supplied by either a hand pump 49 for each cylinder or by a suitable power driven pump with suitable valve controlled manifold connections to the cylinders.

A pressure gauge 50 is provided for each cylinder 45 so that the pressure in each may be determined as desired. In some instances it may be desirable to provide or adjust the pressure in the cylinders at one side differently from those at the other side of the strip as in correcting for skewing. Generally all cylinders 45 should have the same pressure.

The heater 7 provides an alternative means of compensating for skewing, and additionally provides a means to obtain a shrink fit between successive layers where desirable. For this purpose heater 7 comprises a frame 51 supported on the upper ends of beams 27 above sheet 3 and carrying a gas supply manifold 52 to which is attached a plurality of downwardly directed gas burners 53 adapted to apply individual heating flames to adjacent areas of sheet 3. In effect, the flames operate simultaneously to apply heat to a transverse strip-like portion of the sheet for the full width of the sheet so that the latter is progressively heated as it passes beneath the burners 53.

If it is desired to heat soften one side of the sheet a little more or less than the other side, the gas going to the individual valves may be adjusted by suitable regulating valves 54 adjacent the manifold. In this way, skewing may be compensated or prevented.

The effect of heating sheet 3 is to tend to anneal or remove stresses, and it greatly reduces the frictional forces needed at brake 6. Where the metal is of very high tensile strength or high yield point, the heating may reduce the stresses required to produce the pre-stressing desired. Furthermore, when a hot sheet is wrapped tightly on core 19 and previous layers and subsequently cools and shrinks, it applies additional tightening forces and effects additional pre-stressing of the structure as may be desired in some instances.

The apparatus is adapted to accommodate sheets 3 of various widths corresponding to the length of the cylinders to be produced. For this purpose the pin 26 extends for the full length of side frame 4 which corresponds generally to the length of section 18 of spindle 2. Pin 26 has circumferential notches 55 therein equally spaced therealong and adapted to receive a pair of correspondingly spaced flanges 56 on the lower ends of side beams 27.

Beams 27 can be moved toward or away from each other by increments equal to the spacing between two adjacent notches 55. Adjustment of beams 27 as just described generally requires replacement of brake 6 and heater 7 by duplicate units of a length corresponding to the new spacing of beams 27.

In carrying out the method of the present invention a continuous frictional drag is applied to the sheet 3 as it is coiled upon core 19. This drag is made variable both in total amount and in adjacent transverse areas of the sheet. Additionally, according to another phase of the method heat is progressively applied to the sheet as it is progressively and continuously coiled upon core 19. Again the total amount of heat may be varied and the heat in adjacent transverse areas of the sheet may also be varied.

The method has advantages over prior methods of coiling cylinders in that a frequent welding of the layers during the process is not required, although it is permissible where desired. Furthermore, the method controls skewing within desirable limits and provides a more uniform pre-stressing of the cylinder.

Various embodiments of the invention may be employed within the scope of the accompanying claims.

I claim:

1. Apparatus for coiling sheet material in the forming of high strength cylindrical structures, comprising a rotary spindle upon which the structure is to be coiled, means to supply a continuous length of sheet material to the structure as said spindle rotates, a pair of spaced parallel bars defining a throat therebetween through which said material passes from said supply means to said rotary spindle, means rigidly joining said bars at their corresponding ends, frictional elements carried by one of said bars and facing the other at said throat, a plurality of pressure cylinders carried by said other bar and having corresponding pistons movable toward said first bar, and frictional elements carried by said pistons and facing said first named friction elements to frictionally clamp the sheet material therebetween and provide a frictional drag on the material as it is pulled through the throat by said rotary spindle.

2. The apparatus of claim 1 and means to vary the hydraulic pressure in said cylinders.

3. The apparatus of claim 1 and means to vary the hydraulic pressure differently in different of said cylinders.

4. The apparatus of claim 1 and means to support said bars movably in the direction of movement of the sheet material therebetween, and means resisting movement of said bars with the sheet and to measure and indicate the drag forces applied to the sheet by said friction elements.

5. The apparatus of claim 1 and means disposed between said bars and said rotary spindle to apply heat to the sheet for substantially the full width thereof.

6. The apparatus of claim 5 and means to vary the application of heat across the width of the sheet to aid in preventing skewing of the sheet.

References Cited in the file of this patent
UNITED STATES PATENTS

| | | |
|---|---|---|
| 1,386,813 | Townsend | Aug. 9, 1921 |
| 2,144,264 | McRae et al. | Jan. 17, 1939 |
| 2,160,396 | Asbury et al. | May 30, 1939 |
| 2,224,997 | Weisse | Dec. 17, 1940 |
| 2,686,639 | Campbell | Aug. 17, 1954 |
| 2,691,819 | Felton et al. | Oct. 19, 1954 |
| 2,774,593 | Lewis et al. | Dec. 18, 1956 |